United States Patent
Casey

(10) Patent No.: US 6,522,504 B1
(45) Date of Patent: Feb. 18, 2003

(54) HEAD STACK ASSEMBLY AND DISK DRIVE USING A REVERSED DIRECTION HEAD GIMBAL ASSEMBLY

(75) Inventor: Shawn E. Casey, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 150 days.

(21) Appl. No.: 09/773,957

(22) Filed: Jan. 31, 2001

(51) Int. Cl.7 .............................................. G11B 5/48
(52) U.S. Cl. ................................................... 360/245.4
(58) Field of Search .......................... 360/245.1–245.9, 360/244.1–244.3, 234.3–234.6

(56) References Cited

U.S. PATENT DOCUMENTS

| | | | |
|---|---|---|---|
| 4,761,699 A | * | 8/1988 | Ainslie et al. |
| 5,781,379 A | * | 7/1998 | Erpelding et al. ........ 360/245.3 |
| 5,859,749 A | * | 1/1999 | Zarouri et al. ............ 360/245.9 |
| 5,896,248 A | * | 4/1999 | Hanrahan et al. ......... 360/234.5 |
| 5,956,209 A | * | 9/1999 | Shum ...................... 360/245.5 |
| 6,134,084 A | * | 10/2000 | Ohwe et al. .............. 360/244.1 |
| 6,366,431 B1 | * | 4/2002 | Tsuchiya et al. ............ 360/245 |

FOREIGN PATENT DOCUMENTS

| | | | |
|---|---|---|---|
| JP | 53-069623 | * | 6/1978 |
| JP | 10-11923 | * | 1/1998 |

* cited by examiner

*Primary Examiner*—Allen Cao
(74) *Attorney, Agent, or Firm*—W. Chris Kim, Esq.; Milad G. Shara, Esq.; Young Law Firm

(57) ABSTRACT

A disk drive includes a head gimbal assembly and a disk that includes a recording surface. The head gimbal assembly comprises a load beam, the load beam including a first load beam surface facing toward the recording surface and a second load beam surface facing away from the recording surface, a plurality of conductors at least partially supported by the first load beam surface, each conductor including a proximal conductive pad, a distal conductive pad and a conductive path between the proximal and distal conductive pads, the proximal conductive pad being closer to a pivot axis than the distal conductive pad, a gimbal coupled to the load beam, the gimbal including a gimbal proximal end that supports the respective distal conductive pads and a gimbal distal end, and a head for flying above the recording surface of the disk while reading magnetic data recorded on the recording surface of the disk as the disk spins in a rotational direction.

18 Claims, 3 Drawing Sheets

HEAD STACK ASSEMBLY AND DISK DRIVE USING A REVERSED DIRECTION HEAD GIMBAL ASSEMBLY

BACKGROUND OF THE INVENTION

1. Field of the Invention

The present invention relates to disk drives. More particularly, the present invention relates to head stack assemblies and disk drives using a reversed direction head gimbal assembly.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA"); that includes a read/write head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement.

A "rotary" or "swing-type" actuator assembly comprises a body portion that rotates on a pivot bearing cartridge about a pivot axis between limited positions, a coil portion that extends from one side of the body portion to interact with one or more permanent magnets to form a voice coil motor, and an actuator arm that extends from an opposite side of the body portion to support the HGA.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

As shown in FIG. 1, some early HGAs 100 included a number of wires 102 within a tube 104 attached to a side of the actuator arm (not shown in FIG. 1). Herein, the terms "proximal" and "distal" refer to the relative positions of a structure with respect to the pivot axis. For example, the proximal end of a structure is closer to the pivot axis of the actuator arm than is the same structure's distal end. Consistent with the foregoing, the proximal end of each of the wires 102 emerging from the proximal end of the tube is typically soldered to the flex cable. The distal end of each of the wires 102 emerging from the, distal end of the tube 104 may be attached to a corresponding conductive pad of the transducer 106 attached to the trailing edge 108 of the head 110 (the edge of the head 110 that trails as the disk 112 rotates, under the head 110 in the direction indicated by arrow 114). In turn, the head 110 is attached to the gimbal 116 that is supported by the load beam 118. In this configuration, the wires 102 are typically unsupported as they loop from the distal end of the tube to the conductive pads on the transducer 106.

This configuration was adequate for early HGAs. However, more recent developments in the disk drive industry, such as the continuing miniaturization of slider assemblies (including the. head and the transducer) and the transition to magnetoresisitive (MR) heads have led to abandoning such looping wire configurations in favor of a configuration wherein conductive traces are laid on a polyimide film formed on the gimbal assembly. Such technologies are variously named TSA (Trace Suspension Assembly), NSL (No Service Loop), FOS (Flex On Suspension) and the like. Whatever their differences, each of these technologies replaces the discrete twisted wires 102 shown in FIG. 1 with conductive traces (copper, for example) on a layer of insulating material (such as polyimide, for example). These conductive traces interconnect the transducer elements of the head to the drive preamp and the circuits associated therewith.

A conventional TSA-type HGA 200 is shown in FIGS. 2 and 3. As shown therein, a layer of conductive material is deposited or otherwise formed onto a layer of polyimide on the gimbal 216 and selectively etched to create the conductive traces 222 and the polyimide layer(s) 220. A weld 224 electrically connects the transducer 206 to the conductive traces 222. As in the HGA 100 depicted in FIG. 1, the transducer 206 is attached to the trailing edge 208 of the head 210. The conductive traces 222, as best seen in FIG. 2, are coupled to the trailing edge of the head 210 and are routed back in the proximal direction toward the HGA's flex circuit and preamp (not shown in FIG. 1, see FIG. 9) via a lateral extensions of the gimbal 216 called outriggers, as shown at reference numeral 226. However, the outriggers 226 negatively impact the inertia and stroke of the HGA 200, and degrade the performance of the drive in which the HGA 200 is deployed.

In an effort to reduce the HGA's inertia and stroke, FOS-type designs similar to that shown in FIGS. 4 and 5 have been proposed. As shown therein, the HGA 400 includes conductive traces 422 formed on a polyimide layer 420 that are routed under the head 410 and back toward the flex circuit and preamp without using outriggers on either side of the head 410. This reduces the size of the gimbal 416 and correspondingly reduces the HGA's inertia and stroke, but disadvantageously increases the separation between the load point 426 (load point between the load beam 418 and the gimbal 416) and the center of gravity 428 of the head 410.

What are needed, therefore, are improved HGAs, HSAS. In particular, what are needed are improved disk drives, HGAs and HSAs that have reduced inertia and stroke, that do not use discrete wires or outriggers and that do not exhibit an unacceptable vertical separation between the HGA load point and the center of gravity of the head.

SUMMARY OF THE INVENTION

Accordingly, this invention may be regarded as a head stack assembly for a disk drive Shaving a disk. According to the present invention, the head stack assembly comprises a body portion including a bore defining a pivot axis; an actuator arm cantilevered from the body portion and a head gimbal assembly supported at the actuator arm. The head gimbal assembly includes a load beam, which includes a first load beam surface facing toward the disk and a second load beam surface facing away from the disk. A plurality of conductors are at least partially supported by the first load beam surface. Each conductor includes a proximal conductive pad, a distal conductive pad and a conductive path between the proximal and distal conductive pads, the proximal conductive pad being closer to the pivot axis than the distal conductive pad. A gimbal is coupled to the load beam, the gimbal including a gimbal proximal end that supports the respective distal conductive pads and a gimbal distal end. A head is attached to the gimbal, the head including a head proximal end and a head distal end. The head distal end is closer to the gimbal distal end than the gimbal proximal end and the head proximal end is disposed adjacent the respective distal conductive pads. A plurality of head conductive pads are coupled to the head proximal end. The head gimbal assembly also includes means for electrically connecting each of the plurality of head conductive pads to a corresponding distal conductive pad.

According to further embodiments, the plurality of conductors may include an array of conductive traces. The array of conductive traces may define a plane substantially parallel to the pivot axis. The connecting means may include solder or gold bond bonding, for example. The head may include a transducer mounted to the head proximal end and the plurality of head conductive pads may be electrically coupled to the transducer.

The present invention may also be viewed as a magnetic disk drive comprising a disk, the disk including a recording surface, and a head stack assembly. The head stack assembly comprises a body portion including a bore defining a pivot axis, an actuator arm cantilevered from the body portion and a head gimbal assembly supported at the actuator arm. The head gimbal assembly includes a load beam, the load beam including a first load beam surface facing toward the recording surface and a second load beam surface facing away from the recording surface. A plurality of conductors are least partially supported by the first load beam surface and each conductor includes a proximal conductive pad, a distal conductive pad and a conductive path between the proximal and distal conductive pads. The proximal conductive pad, according to the present invention, is closer to the pivot axis than the distal conductive pad. A gimbal is coupled to the load beam, the gimbal including a gimbal proximal end that supports the respective distal conductive pads and a gimbal distal end. The head gimbal assembly also includes a head for flying above the recording surface of the disk while reading magnetic data recorded on the respective surface of the disk as the disk spins in a rotational direction. The head includes a leading edge and a trailing edge, the leading edge being closer to the gimbal distal end than the gimbal proximal end and leading the trailing edge over the disk as the disk rotates in the rotational direction. A plurality of head conductive pads are coupled to the trailing edge of the head and each of the plurality of head conductive pads are electrically connected to a corresponding distal conductive pad.

The present invention is also a head gimbal assembly for a head stack assembly of a disk drive having a disk that includes a recording surface. The head stack assembly includes a body portion including a bore defining a pivot axis and an actuator arm cantilevered from the body portion. The head gimbal assembly includes a load beam, which includes a first load beam surface facing toward the recording surface and a second load beam surface facing away from the recording surface. A plurality of conductors are at least partially supported by the first load beam surface, each conductor including a proximal conductive pad, a distal conductive pad and a conductive path between the proximal and distal conductive pads. The proximal conductive pad is closer to the pivot axis than the distal conductive pad. A gimbal is coupled to the load beam, the gimbal including a gimbal proximal end that supports the respective distal conductive pads and a gimbal distal end. The head gimbal assembly further includes a head for flying above the recording surface of the disk while reading magnetic data recorded on the recording surface of the disk as the disk spins in a rotational direction. The head includes a leading edge and a trailing edge, the leading edge being closer to the gimbal distal end than the gimbal proximal end and leading the trailing edge over the disk as the disk rotates in the rotational direction. A plurality of head conductive pads are coupled to the trailing edge of the head and each of the plurality of head conductive pads are electrically connected to a corresponding distal conductive pad.

The foregoing and other features of the invention are described in detail below and set forth in the appended claims.

DESCRIPTION OF THE PREFERRED EMBODIMENTS

Figure 9:
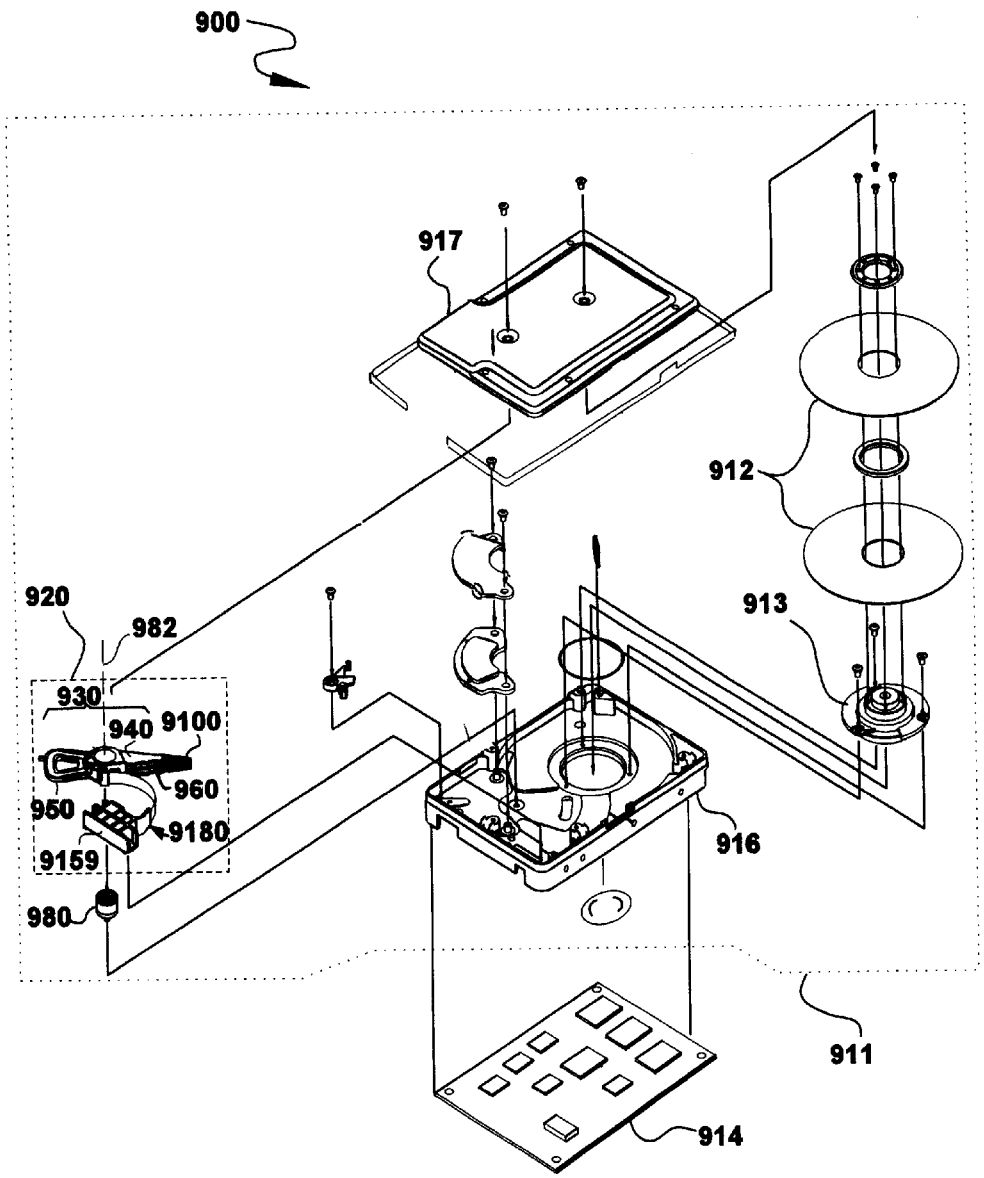
FIG. 9 is an exploded view of a magnetic disk drive according to an embodiment of the present invention.

FIG. 9 shows the principal components of a disk drive such as a magnetic hard disk drive 900 constructed in accordance with this invention. With reference to FIG. 9, the preferred disk drive 900 is an integrated drive electronics (IDE) drive comprising an HDA 911 and a PCBA 914.

The HDA 911 includes a base 916 and a cover 917 attached to the base 916 that collectively house a magnetic disk 912 (two shown), a spindle motor 913 attached to the base 916 for rotating the mounted disk 912, a head stack assembly 920, and a pivot bearing cartridge 980 (such as a stainless steel pivot bearing cartridge, for example) that rotatably supports the HSA 920 on the base 916. Preferably, the spindle motor 913 rotates the disk 912 at a constant angular velocity. The preferred HSA 920 comprises a swing-type or rotary actuator assembly 930, at least one HGA 9100, and a flex circuit cable assembly 9180. The rotary actuator assembly 930 includes a body portion 940, at least one actuator arm 960 cantilevered from the body portion 940, and a coil portion 950 cantilevered from the body portion 940 in an opposite direction from the actuator arm 960. The actuator arm 960 supports the HGA 9100 with a head located at or near its far distal end that is biased toward and moveable over the disk 912. The flex cable assembly 9180 includes a flex circuit cable 9150 and a flex clamp 9159. The HSA 920 is pivotally secured to the base 916 via the pivot bearing cartridge 980 so that the head at the distal end of the HGA 9100 may be moved over a recording surface of the disk 912. The pivot bearing cartridge enables the HSA 920 to pivot about a pivot axis, shown in FIG. 9 at reference numeral 982. The storage capacity of the HDA 911 may be increased, as shown in FIG. 9, by including several disks 912 and a HSA 920 having a vertical "stack" of HGAs 9100 supported by multiple actuator arms 960.

Figure 6:
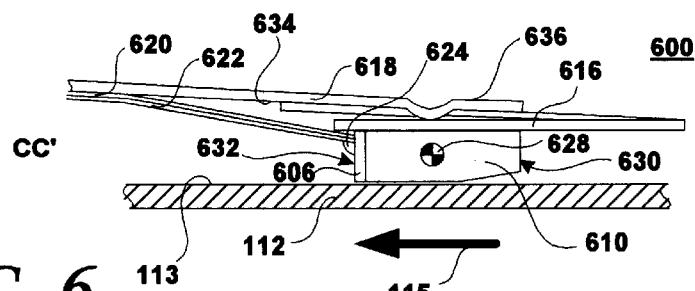
FIG. 6 shows a cross sectional view of a portion of a Head Gimbal Assembly according to an embodiment of the present invention, taken along line CC' of FIG. 8.
Figure 7:
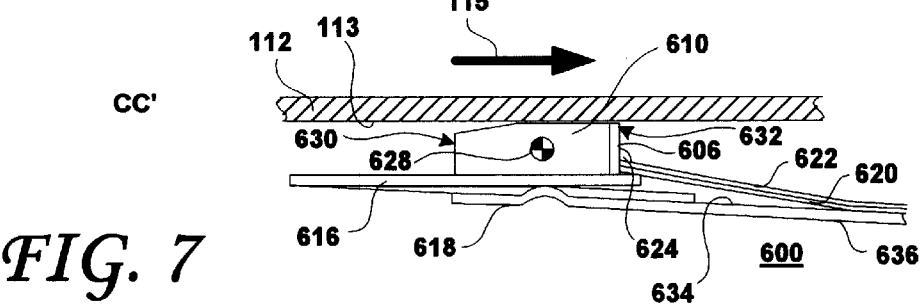
FIG. 7 shows a side view of the Head Gimbal Assembly of FIG. 6 in another orientation.
Figure 8:
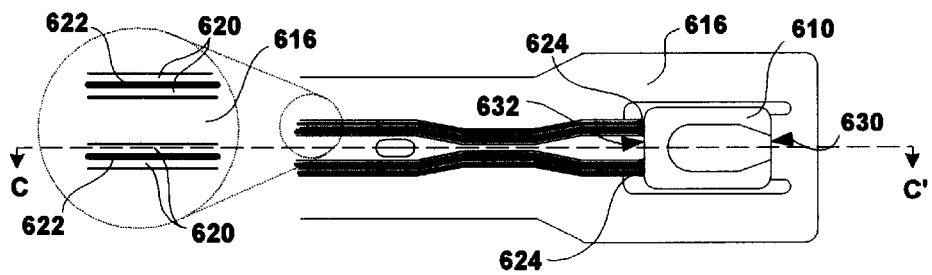
FIG. 8 shows a top view of a Head Gimbal Assembly according to an embodiment of the present invention.
Figure 10:
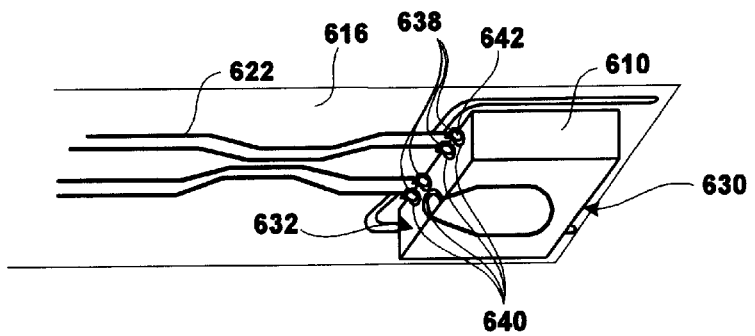
FIG. 10 is a perspective representation of the interface between the head and the gimbal, according to the present invention.

FIGS. 6 and 7 each show a side view of a portion of a HGA 600 for a HSA of a magnetic disk drive, according to an embodiment of the present invention. The HGAs 600 of FIG. 6 and 7 are each shown, for illustrative and orientation purposes only, along with a portion of a disk 112 having a recording surface 113. It is understood, however, that the disk 112 itself forms no part of the present invention. As shown, the HGA 600 includes a load beam 618, which includes a first load beam surface 634 facing toward the recording surface 113 and a second load beam surface 636 facing away from the recording surface 113. A plurality of conductors 622 are at least partially supported by the first load beam surface 634. As shown particularly in FIGS. 8 and 10, the plurality of conductors 622 may be arranged as an array of conductive traces formed on an insulating layer 620, such as a layer of selectively etched polyimide, for example. In an alternative embodiment, the plurality of conductors may be arranged as discrete wires. The array of conductive traces thus defines a plane that is substantially perpendicular to the pivot axis 982. As best shown in FIGS. 8 and 10, each conductor 622 includes a proximal conductive pad (not shown), a distal conductive pad 638 and a conductive path between the proximal and distal conductive pads. According to the present invention, the proximal conductive pad is closer to the pivot axis 982 than is the distal conductive pad 638.

A gimbal 616 is coupled to the load beam 618. The gimbal 616 includes a gimbal proximal end that supports the respective distal conductive pads 638 and a gimbal distal end. The HGA 600 further includes a head 610 that, in operation of the disk drive, flies above the recording surface 113 of the disk 112 while reading magnetic data recorded on the recording surface 113 of the disk 112 as the disk 112 spins in the rotational direction indicated by arrow 114. The head 610 includes a leading edge 630 and a trailing edge 632. The leading edge 630 of the head 610, according to the present invention, is closer to the gimbal distal end than the gimbal proximal end. Moreover, the leading edge 630 of the head 610 leads the trailing edge 632 thereof over the disk 112 as the disk 112 rotates in the rotational direction 114. As shown in FIG. 10, the HGA 600 includes a plurality of head conductive pads 640 coupled to the trailing edge 632 of the head 610. Each of the plurality of head conductive pads 640 is electrically connected to a corresponding distal conductive pad 638 by solder, gold bond bonding, stick bonding or any other suitable means (collectively denoted in FIG. 10 by reference numeral 642), as those of skill in this art will readily recognize. As is apparent in FIGS. 6 and 7, the head 610 includes a transducer 606 mounted to proximal end (the end of the head 610 that is closest the pivot axis 982) of the head 610 and the plurality of head conductive pads 640 are electrically coupled to the transducer 606, as bests depicted in FIG. 10.

Figure 1:
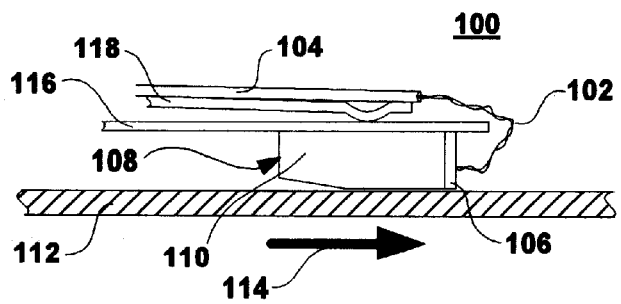
FIG. 1 is a side view of a portion of a conventional Head Gimbal Assembly.
Figure 2:
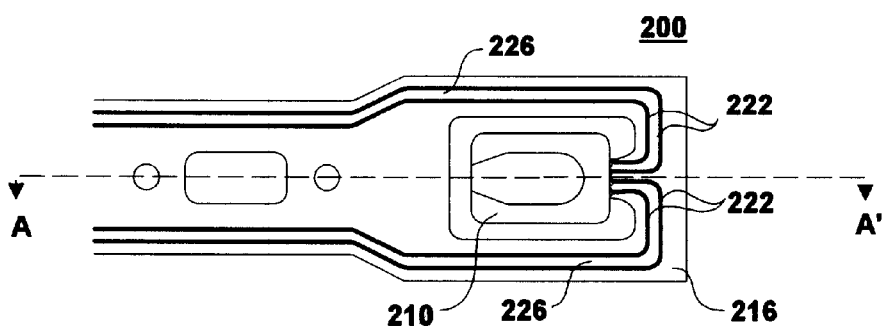
FIG. 2 is top view of an example of a conventional Head Gimbal Assembly of the Trace Suspension Assembly type.
Figure 3:
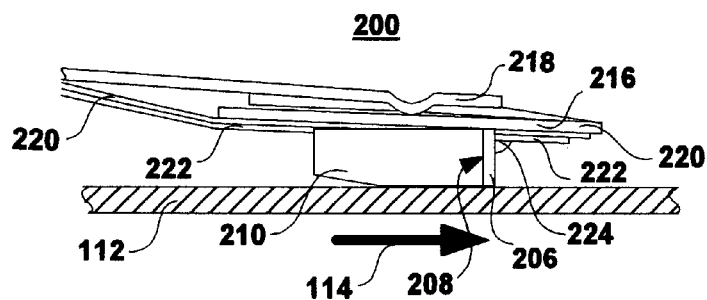
FIG. 3 is a cross sectional view along line AA' of the conventional Head Gimbal Assembly shown in FIG. 2.
Figure 4:
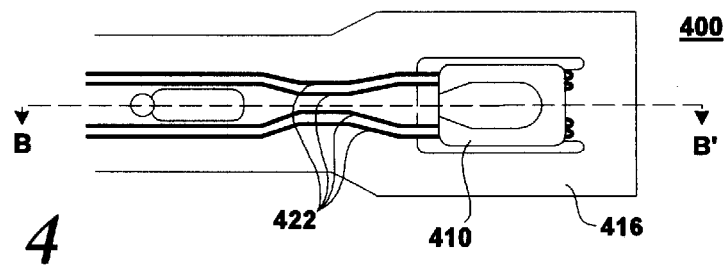
FIG. 4 is a top view of an example of a conventional Head Gimbal Assembly of the Flex On Suspension type.
Figure 5:
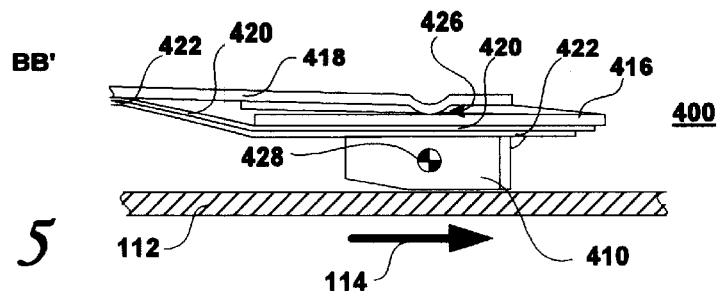
FIG. 5 is a cross sectional view along line BB' of the conventional Head Gimbal Assembly of FIG. 4.

In effect, the present invention provides for spinning the disk in a direction 115 that is opposite to the rotational direction 114 of conventional drives. Moreover, the head 610 is turned 180 degrees from its conventional orientation, with advantageous results. Eliminating the outrigger portions and the looping back of the polyimide and copper traces reduces the inertia and stroke of the HGA, as compared at least with conventional TSA and FOS-type HGAs. In addition, these advantages are achieved without increasing the vertical separation between the center of gravity 628 of the head 610 and the load point between the load beam 618 and the gimbal 616, as compared to the FOS-type design illustrated in FIGS. 4 and 5.

What is claimed is:

1. A head stack assembly for a disk drive having a disk, the head stack assembly comprising:
   a body portion including a bore defining a pivot axis; an actuator arm cantilevered from the body portion;
   a head gimbal assembly supported at the actuator arm and including:
      a load beam, the load beam including:
         a first load beam surface facing toward the disk and a second load beam surface facing away from the disk;
         a plurality of conductors at least partially supported by the first load beam surface, each conductor including a proximal conductive pad, a distal conductive pad and a conductive path between the proximal and distal conductive pads, the proximal conductive pad being closer to the pivot axis than the distal conductive pad;
      a gimbal coupled to the load beam, the gimbal including a gimbal proximal end that supports the respective distal conductive pads and a gimbal distal end;
      a head attached to the gimbal, the head including a head proximal end and a head distal end; the head distal end being closer to the gimbal distal end than the gimbal proximal end, the head proximal end being disposed adjacent the respective distal conductive pads;
      a plurality of head conductive pads coupled to the head proximal end; and means for electrically connecting each of the plurality of head conductive pads to corresponding distal conductive pad.

2. The head stack assembly of claim 1, wherein the plurality of conductors includes an array of conductive traces.

3. The head stack assembly of claim 2, wherein the array of conductive traces defines a plane substantially parallel to the pivot axis.

4. The head stack assembly of claim 1, wherein the connecting means include solder.

5. The head stack assembly of claim 1, wherein the connecting means includes gold bond bonding.

6. The head stack assembly of claim 1, wherein the head includes a transducer mounted to the head proximal end and wherein the plurality of head conductive pads are electrically coupled to the transducer.

7. A magnetic disk drive comprising:
   a disk having a recording surface;
   a head stack assembly, the head stack assembly comprising:
      a body portion including a bore defining a pivot axis; an actuator arm cantilevered from the body portion;
      a head gimbal assembly supported at the actuator arm and including:
         a load beam, the load beam including:
            a first load beam surface facing toward the recording surface and a second load beam surface facing away from the recording surface;

a plurality of conductors at least partially supported by the first load beam surface, each conductor including a proximal conductive pad, a distal conductive pad and a conductive path between the proximal and distal conductive pads, the proximal conductive pad being closer to the pivot axis than the distal conductive pad;

a gimbal coupled to the load beam, the gimbal including a gimbal proximal end that supports the respective distal conductive pads and a gimbal distal end;

a head for flying above the recording surface of the disk while reading magnetic data recorded on the respective surface of the disk as the disk spins in a rotational direction, the head including a leading edge and a trailing edge, the leading edge being closer to the gimbal distal end than the gimbal proximal end and leading the trailing edge over the disk as the disk rotates in the rotational direction;

a plurality of head conductive pads coupled to the trailing edge of the head; and means for electrically connecting each of the plurality of head conductive pads to a corresponding distal conductive pad.

8. The disk drive of claim 7, wherein the plurality of conductors include an array of conductive traces.

9. The disk drive of claim 8, wherein the array of conductive trances defines a plane substantially parallel to the pivot axis.

10. The disk drive of claim 7, wherein the connecting means include solder.

11. The disk drive of claim 7, wherein the connecting means includes gold bond bonding.

12. The disk drive of claim 7, wherein the head includes a transducer mounted to the head proximal end and wherein the plurality of head conductive pads are electrically coupled to the transducer.

13. A head gimbal assembly for a head stack assembly of a disk drive having a disk that includes a recording surface, the head stack assembly including a body portion including a bore defining a pivot axis and an actuator arm cantilevered from the body portion, comprising:

a load beam, the load beam including:

a first load beam surface facing toward the recording surface and a second load beam surface facing away from the recording surface;

a plurality of conductors at least partially supported by the first load beam surface, each conductor including a proximal conductive pad, a distal conductive pad and a conductive path between the proximal and distal conductive pads, the proximal conductive pad being closer to the pivot axis than the distal conductive pad;

a gimbal coupled to the load beam, the gimbal including a gimbal proximal end that supports the respective distal conductive pads and a gimbal distal end;

a head for flying above the recording surface of the disk while reading magnetic data recorded on the recording surface of the disk as the disk spins in a rotational direction, the head including a leading edge and a trailing edge, the leading edge being closer to the gimbal distal end than the gimbal proximal end and leading the trailing edge over the disk as the disk rotates in the rotational direction;

a plurality of head conductive pads coupled to the trailing edge of the head; and means for electrically connecting each of the plurality of head conductive pads to a corresponding distal conductive pad.

14. The head gimbal assembly of claim 13, wherein the plurality of conductors includes an array of conductive traces.

15. The head gimbal assembly of claim 14, wherein the array of conductive traces defines a plane substantially parallel to the pivot axis.

16. The head gimbal assembly of claim 13, wherein the connecting means include solder.

17. The head gimbal assembly of claim 13, wherein the connecting means includes gold bond bonding.

18. The head gimbal assembly of claim 13, wherein the head includes a transducer mounted to the head proximal end and wherein the plurality of head conductive pads are electrically coupled to the transducer.

* * * * *